United States Patent [19]

Nossen

[11] 4,206,423

[45] Jun. 3, 1980

[54] DIGITIZED PHASE MODULATING MEANS

[75] Inventor: Edward J. Nossen, Cherry Hill, N.J.

[73] Assignee: RCA Corporation, New York, N.Y.

[21] Appl. No.: 948,099

[22] Filed: Oct. 3, 1978

[51] Int. Cl.² .................................................. H04L 27/20
[52] U.S. Cl. ...................................... 332/9 R; 375/67;
332/16 R; 332/21
[58] Field of Search ........................ 332/9 R, 16 R, 21;
325/30, 38 R, 45, 143, 145, 161, 163, 164

[56] References Cited

U.S. PATENT DOCUMENTS 3,983,485   9/1976   Stuart ............................. 325/163 X

OTHER PUBLICATIONS

Volertas et al., "Phase Modulation Techniques for Digital Communication Systems", International Telecommunications Conference Proceedings, Oct. 9, 1977, pp. 1-7.

Primary Examiner—Siegfried H. Grimm
Attorney, Agent, or Firm—H. Christoffersen; Samuel Cohen; Donald W. Phillion

[57] ABSTRACT

A digitized phase modulating system in which a clock pulse signal of frequency $C_a$ is divided by a counter of count capacity N, which when N=4, produces four signals having phases spaced at intervals of 0°, 90°, 180° and 270°. Signal selecting logic means including counting means is responsive to data clock pulses of frequency $mf_s$ (where m is an integer) and to the binary contents of successive states of a binary modulation sequence of bit rate $f_s$ to successively select various ones of said four signals whose successive phases are indicative of the contents of said successive states of said binary modulation sequence.

12 Claims, 11 Drawing Figures

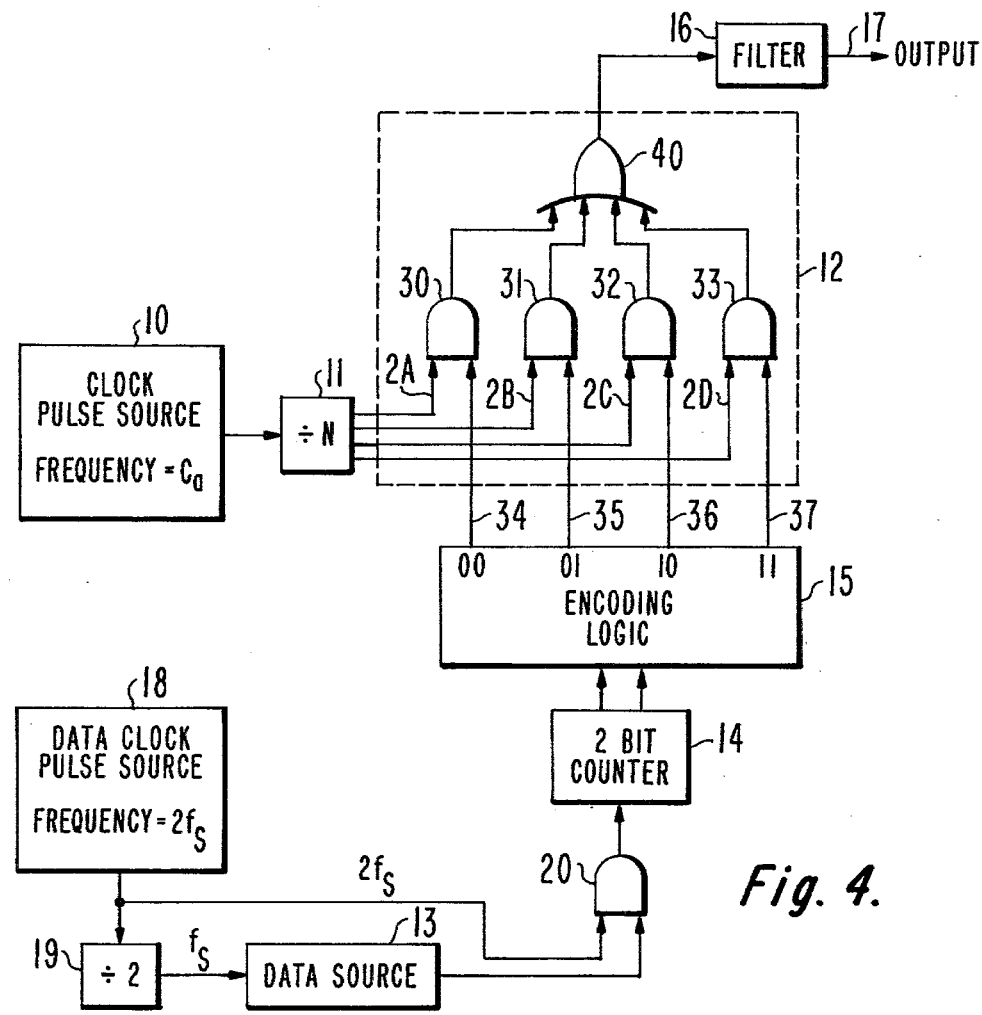
Fig. 4.
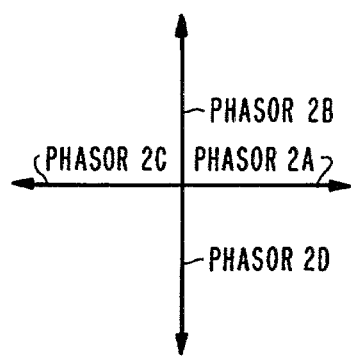
Fig. 3.
| OUTPUT OF ENCODING LOGIC | PHASOR SELECTED |
|---|---|
| 00 | 2A |
| 01 | 2B |
| 10 | 2C |
| 11 | 2D |
Fig. 5.

| CONTENTS OF DATA SOURCE 55 | CONTENTS OF DATA SOURCE 56 | SELECTED OUTPUT TERMINAL OF LOGIC 57 |
|---|---|---|
| 0 | 0 | 58 |
| 0 | 1 | 59 |
| 1 | 0 | 60 |
| 1 | 1 | 61 |

| BINARY CONTENT OF DATA SOURCE 55 | BINARY CONTENT OF DATA SOURCE 56 | PHASE CHANGE FROM PREVIOUS PHASOR | OUTPUT TERMINAL OF ENCODING LOGIC 57 ENERGIZED |
|---|---|---|---|
| 0 | 0 | 0° | 78 |
| 0 | 1 | +90 | 79 |
| 1 | 0 | +180° | 80 |
| 1 | 1 | −90 | 81 |

DIGITIZED PHASE MODULATING MEANS

This invention relates generally to phase angle modulating systems and more particularly, to digitized phase modulating means.

Many analog systems are presently known for generating various types of phase modulation such as, for example, unidirectional phase shift keying (UPSK), orthogonal unidirectional phase shift keying, binary phase shift keying (BPSK), conventional quadrature phase shift keying (CQPSK), or offset keyed-quadrature phase shift keying (OKQPSK).

One disadvantage of such analog circuits is the inability to control the phase relationship of the needed quadrature carrier signals or the quadrature data signals with sufficient precision. More specifically, the phases of the I and Q carrier signals can easily vary from their desired 90° angular difference by 2° or 3°, which can introduce a substantial amount of spurious signal into the modulation process, with resulting substantial demodulation problems.

It is a primary object of the present invention to provide systems which effect phase angle modulation with precise phase shifts.

In a preferred form of the present invention, there is provided means for generating N clock signals, each of frequency $C_a/N$ and separated by a phase angle 360°/N, where N is an integer, means for producing a two-level binary modulation sequence signal which changes its state of modulation at the data rate $f_s$, and logic means responsive to the nature of the binary information contained in said binary modulation sequence to select a predetermined one of said N clock signals whose phase identifies said binary information.

In the drawings:

FIG. 3 is a vector diagram showing the phase relation of the clock signals when N=4;

FIG. 4 is a more detailed diagram of the structure of FIG. 1;

FIG. 5 is a truth table showing the relation between the output of counter encoding logic of FIG. 4 and the particular one of the N clock signals selected thereby;

Figure 1:
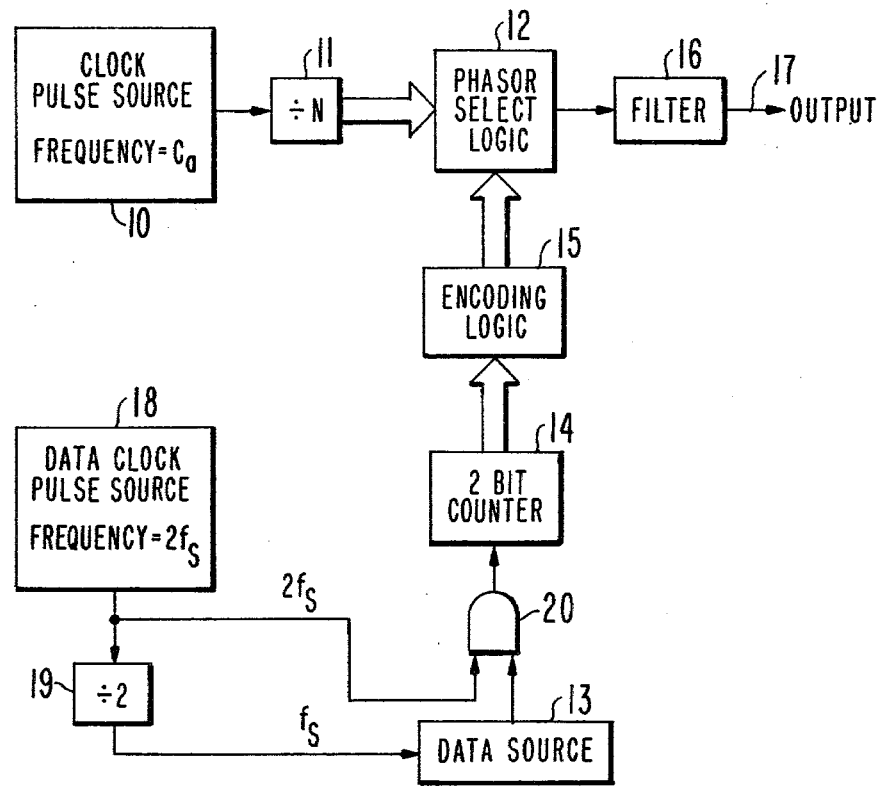
FIG. 1 is a block diagram of one form of the invention adapted to effect UPSK type phase modulation.

In FIG. 1 the clock pulse source 10 supplies a signal, which can be a train of clock pulses of frequency $C_a$, to divide-by-N counter 11. In response to this train of clock pulses, the divider counter 11 produces N output signals each of frequency $C_a/N$ and spaced apart by 360°/N. Assume N=4, although it can be equal to other integers. When N=4 the output of divider 11 will be the four two-level signals 2A, 2B, 2C and 2D of frequency $C_a/N$ shown in FIGS. 2A, 2B, 2C and 2D and which are spaced apart 90°.

The output signals from divider 11 will sometimes be referred to herein as phasors. Thus, the four two-level output signals of FIGS. 2A, 2B, 2C and 2D are phasors, spaced apart by 90° as shown in the vector diagram of FIG. 3. Further, for purposes of ease of identification, the output signals from divider 11 and the output terminals of divider 11 on which they appear are identified by the same reference characters employed to identify the figures which show them. Thus, the phasor 2C in FIG. 3 is the same signal as the waveform 2C of FIG. 2C, and appears on output lead 2C of divider 11, as shown in FIG. 4.

Figure 2:
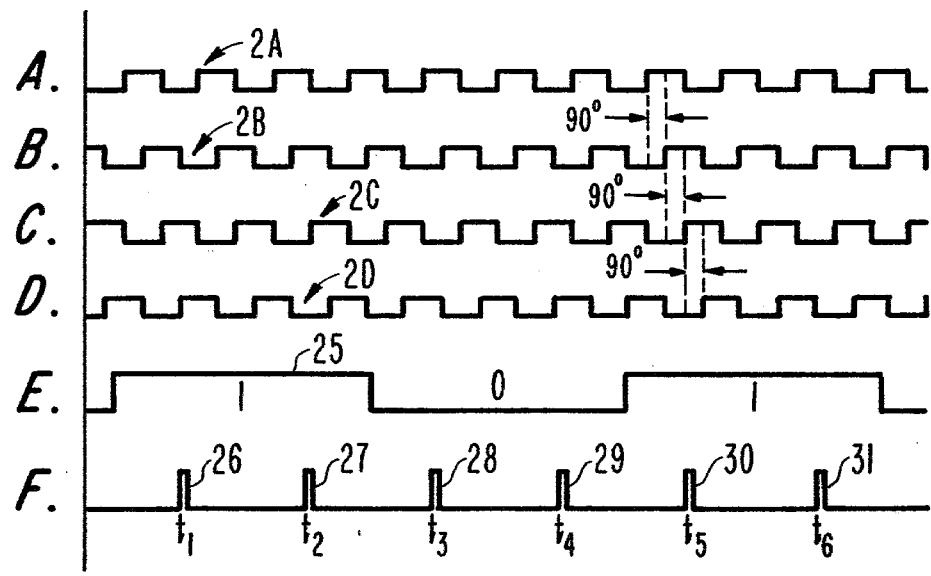
FIG. 2 is a set of waveforms of signals appearing at various points in the circuit of FIG. 1.

Selection of succeeding ones of the four phasor signals 2A–2D of FIG. 2 by phasor select logic 12 of FIG. 1 represents certain changes in the nature of the binary data being supplied from data source 13. More specifically, the phasor select logic 12 responds to the nature of the bit being supplied from data source 13, as represented by the count contained in counter 14, and as such count is encoded by encoding logic 15, to select one of the four output signals 2A–2D shown in FIG. 2. The phase of such selected output signal identifies the binary data being supplied from data source 13.

If the structure of FIG. 1 is effecting differentially coherent UPSK, the occurrence of each bit 1 will, by definition of differentially coherent UPSK, advance the phase of the carrier signal (the output phasors of divider 11) by 180° in two 90° steps from the phase of the immediately prior phasor selected from the four output phasors of divider 11. Thus, if phasor 2B of FIG. 2B is the immediately prior phasor selected from the output of divider 11 by phasor select logic 12, the occurrence of a 1 bit 25 (shown in FIG. 2E), from data source 13 will cause the phasor select logic 12, in cooperation with counter 14 and decode logic 15, to successively select waveform 2C and then waveform 2D. The 180° phase advance is done in two 90° steps to avoid the generation of excessive spurious signals which would result from a single 180° phase advance. The finally selected waveform 2D is supplied to filter 16 which responds thereto to supply a sine wave shaped signal to output lead 17.

The counter 14 and the encoding logic 15 function generally as follows. In response to the binary 1 bit 25 of FIG. 2E, the two bit position counter 14 advances two counts by virtue of the two pulses 26 and 27 of FIG. 3F being supplied thereto from data clock pulse source 18 and through AND gate 20 during the period $1/f_s$ of the binary 1 bit 25. The encoding logic 15 responds to the two count increase in counter 14 to generate output signals which cause phasor select logic 12 to successively select the next two 90° phase advanced phasors from divider 11. Specifically, the phasor select logic 12, in response to pulse 26 of FIG. 2F occurring at time $t_1$, will advance its phasor selection from the immediately prior selected phasor 2B to phasor 2C for a first phase advance of 90°, and then to phasor 2D, in response to the next pulse 27 occurring at time $t_2$, for a total phase advance of 180°.

The occurrence of pulses 28 and 29 at times $t_3$ and $t_4$ (FIG. 2F) from source 18, have no effect on phasor select logic 12 since they occur during the occurrence of a binary 0 bit from data source 13. Pulses 30 and 31, however, will cause phasor select logic 12 to advance the selection of the phasor outputs from divider 11 from phasor 2D of FIG. 2 to phasor 2A and then to phasor 2B at times t₅ and t₆, respectively, since such pulses 30 and 31 occur during the occurrence of a binary 1 in data source 13.

The data clock pulse source 18 also supplies data clock timing pulses of frequency $f_s$ to data source 13 through divide-by-two circuit 19.

FIG. 4 shows suitable detailed logic which can be employed in the phase select logic block 12 of FIG. 1. Corresponding parts of FIGS. 1 and 4, and also the other figures, are identified by the same reference characters. In FIG. 4 the four output terminals 2A, 2B, 2C and 2D of divide-by-N counter 11 (N=4) supply the phasor signals 2A, 2B, 2C and 2D individually to one input of each of the four AND gates 30, 31, 32 and 33, respectively. The four output terminals 34, 35, 36 and 37 of encoding logic 15 supply the encoded four binary output permutations of the two-bit counter 14 to the other input terminals of AND gates 30, 31, 32 and 33. Thus, a binary count of 00 in counter 14 will be encoded by encoding logic 15 to energize output terminal 34 thereof and thereby prime AND gate 30 to pass phasor 2A from counter 11 therethrough and then through OR gate 40 to filter 16. Similarly, a binary count of 10 in counter 14 will be encoded by logic 15 to energize output terminal 36 thereof, thereby priming AND gate 32 to pass the waveform 2C from counter 11 therethrough and then through OR gate 40.

FIG. 5 is a truth table showing the relationship between the four possible binary contents of counter 14 and the particular phasor selected thereby from the four output phasors of divider 11.

Since the four output phasors 2A, 2B, 2C and 2D are always present on the four output leads 2A, 2B, 2C and 2D of divider 11, the priming of any of the AND gates 30, 31, 32 or 33 by an energized output terminal of encoding logic 15 will immediately pass the selected phasor through the enabled AND gate to OR gate 40.

As discussed above re FIG. 1, the counter 14 will advance two counts during the occurrence of each binary 1 from data source 13 by virtue of two pulses from data clock pulse source 18 passing through AND gate 20 to counter 14. Each count incremented by counter 14 will result in the selection of a phasor whose phase is advanced by 90° over the previous phasor, as indicated in the truth table of FIG. 5. The phase of the output signal can be retarded by reversing the encoding logic connections to gates 30, 31, 32 and 33.

Figures 6, 9:
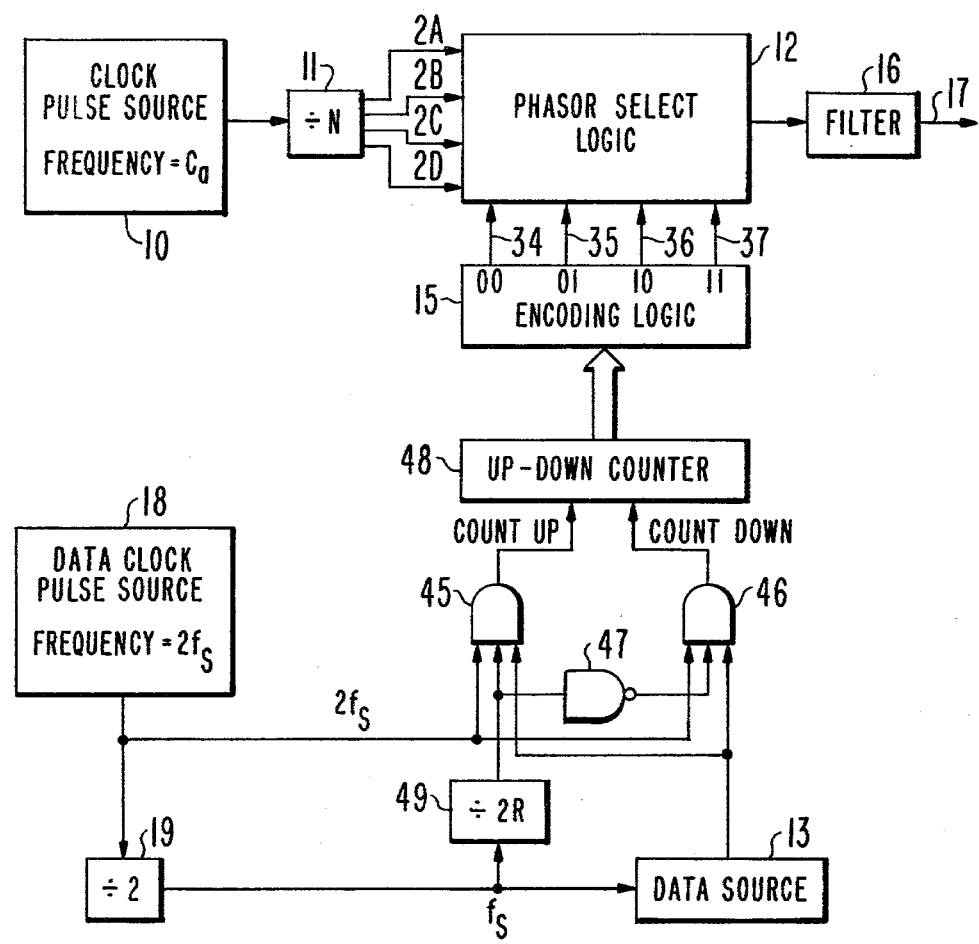
FIG. 6 is a block diagram of a form of the invention adapted to effect orthogonal type UPSK.
FIG. 9 is a truth table showing the relation of the modulating binary data of FIG. 7 and the phasor selected thereby.

FIG. 6 shows a form of the invention adapted to effect orthogonal differentially coherent UPSK. The principal differences between the structures of FIG. 4 and FIG. 6 is that the two-bit counter 14 and the AND gate 20 of FIG. 4 have been replaced in FIG. 6 by two-bit position up/down counter 48, AND gates 45 and 46, INVERTER 47 and divider 49. Such added logic of FIG. 6 enables the selection of the output of counter 11 in either direction, i.e., phasors of advancing or retarding phase.

Specifically, in operation, the divider 49 alternately primes AND gates 45 and 46 every R occurrence of a data clock pulse $f_s$. During the first R counts the most significant bit position of counter 49 contains a binary 0 so that AND gate 46 is primed through INVERTER 47 and AND gate 45 is disabled. During the second R counts, the most significant bit position of divider 49 contains a binary 1 so that AND gate 45 is primed and AND gate 46 is disabled through INVERTER 47.

During alternate, even-numbered groups of R bit periods, therefore, two data clock pulses from source 18 will pass first through AND gate 46 upon the occurrence of each binary 1 in data source 13 to cause up/down counter 48 to count up one count for each of the two data clock pulses, and during the odd-numbered groups of R bit periods, the two data clock pulses from source 18 will pass through AND gate 45 upon the occurrence of each binary 1 in data source 13 to cause up/down counter 48 to count down one count for each data clock pulse. Thus, the average frequency of the output signal of the system remains equal to $C_a/4$ when N=4.

The count contained in the two-bit position up/down counter 48 is encoded by encoding logic 15 to energize one of the four output terminals 34–37 thereof which causes phasor select logic 12 to select one of the phasor outputs from counter 11 in accordance with the truth table of FIG. 5.

Since the structure of FIG. 6 is constructed to effect orthogonal UPSK, the occurrence of a binary 0 from data source 13 results in no change of counter 48 and therefore no change in phasor selection.

Figure 7:
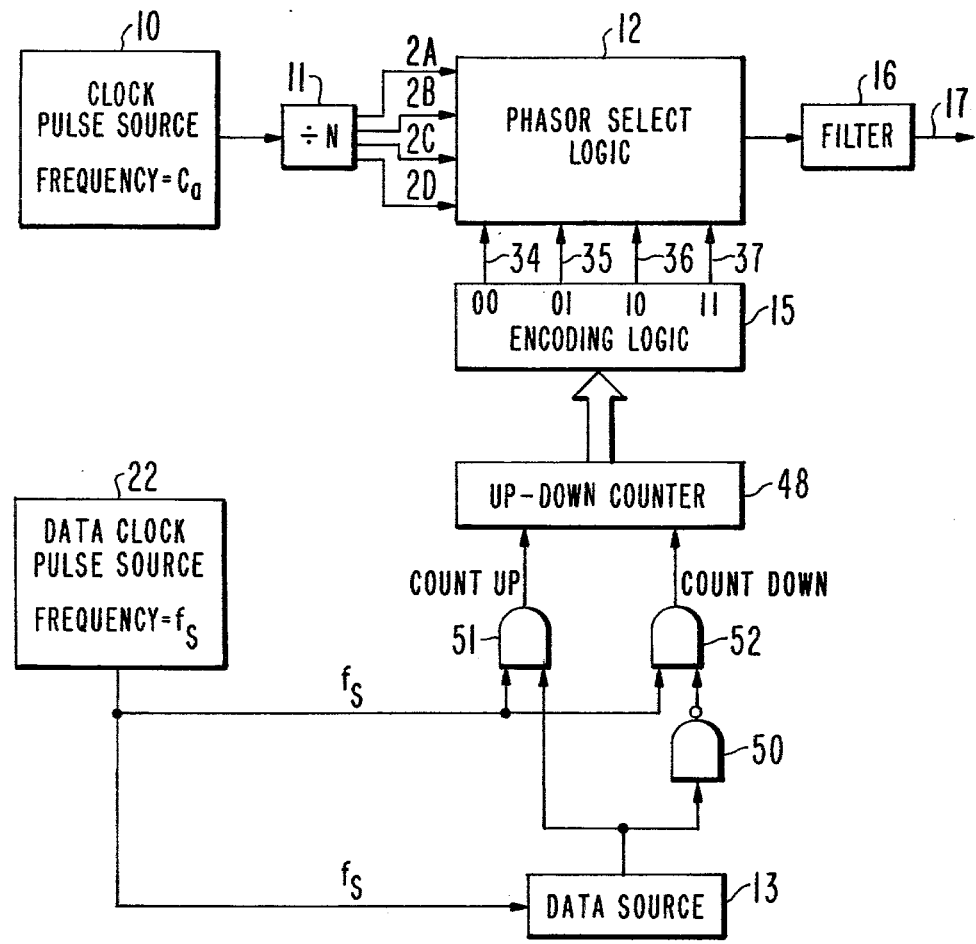
FIG. 7 is a block diagram of still another form of the invention for effecting OKQPSK type modulation.

FIG. 7 shows a structure similar to that of FIG. 6 but adapted to effect a modified differentially coherent PSK in which the phase of the modulated carrier is shifted 90° in a first direction upon the occurrence of each binary 1 in data source 13 and is shifted 90° in the opposite direction upon the occurrence of each binary 0 in data source 13. A 180° phase difference exists between a binary 1 versus a binary 0 in the same bit position.

To implement the foregoing there is provided AND gates 51 and 52 and INVERTER 50. Each binary 1 in data source 13 primes AND gate 51 to permit one pulse from data clock pulse source 22 to pass therethrough and cause two-bit position up/down counter 48 to count up one count, thereby causing phasor select logic 12, through encoding logic 15, to select from the output of counter 11, a phasor which is 90° advanced with respect to the immediately preceding selected phasor.

Each binary 0 from data source 13 primes AND gate 52 through INVERTER 50 to permit one pulse from source 22 to pass therethrough and cause counter 48 to count down one count and thereby cause phasor select logic 12, through encoding logic 15, to select a phasor output from counter 11 which lags 90° behind the immediately preceding selected phasor.

The encoding logic 15 of FIG. 7 encodes the count contained in up/down counter 48 with the same input/output relation as described in connection with the structure of FIG. 6. Therefore the signals appearing on the four output terminals 34–37 of encoding logic 15 cause the phasor select logic 12 to select phasors from counter 11 in accordance with the truth table of FIG. 5.

Figures 8, 11:
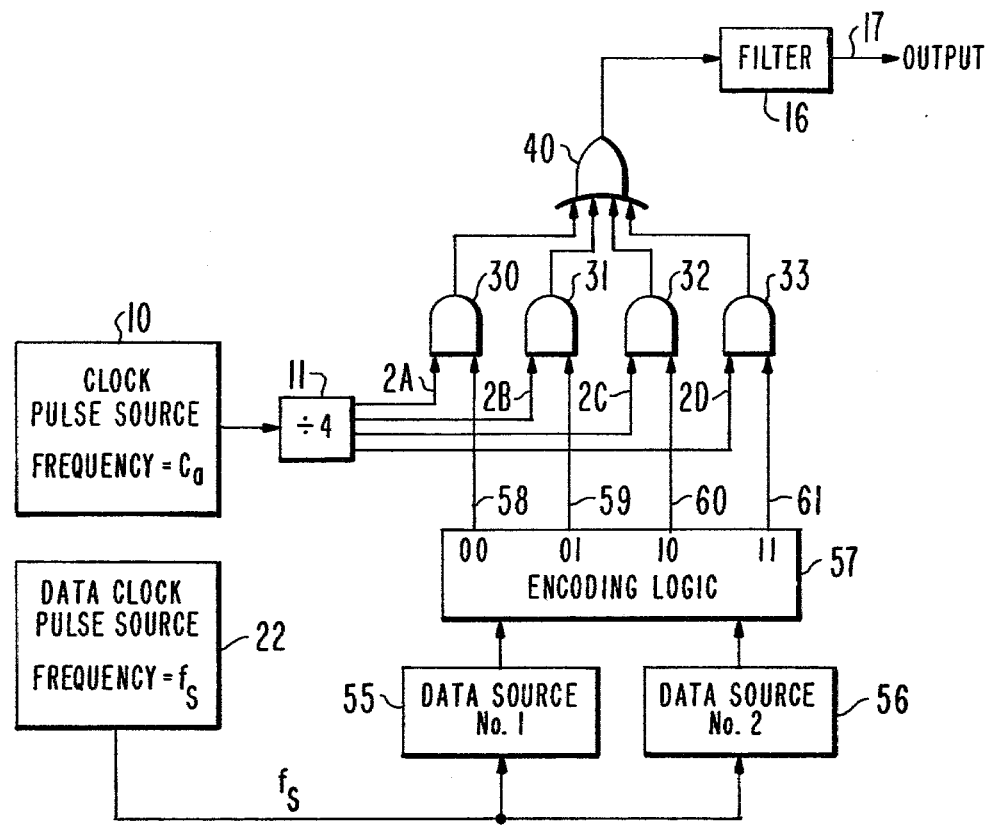
FIG. 8 is a diagram of a form of the invention for effecting QPSK type modulation.
FIG. 11 is a truth table relating to FIG. 10 and showing the relation of the modulating binary data and the phase shift representative thereof.

The structure of FIG. 8 encodes the binary data output from two data sources 55 and 56 in a form of QPSK in which each permutation of binary outputs from data sources 55 and 56 will always select a given phasor output signal from divider 11 in accordance with the truth table of FIG. 9. For example, the occurrence of a binary 1 in data source 55 and a binary 0 in data source 56 will always energize output terminal 60 of encoder logic 57 to prime AND gate 32 and thus pass phasor 2C therethrough to OR gate 40 and then to filter 16. As another example, the occurrence of a binary 0 in both data sources 55 and 56 will always energize output terminal 58 of encoding logic 57 to prime AND gate 30 and thereby select phasor 2A.

In this form of QPSK modulation, a reference phase is required at the demodulator. Such reference phase can be obtained by transmission of an identifiable preamble containing the phase of phasor 2A, for example.

Figure 10:
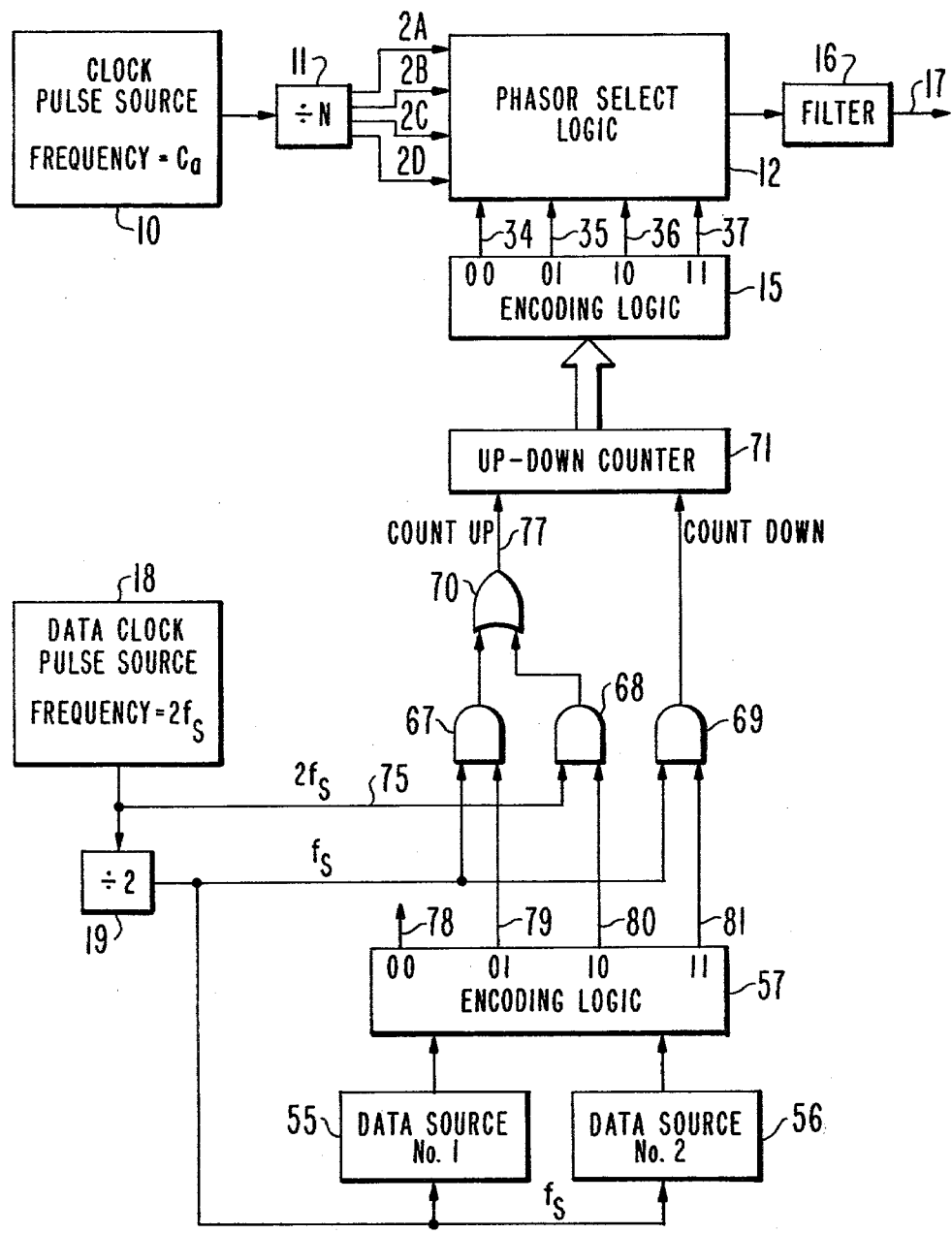
FIG. 10 is a block diagram of yet another form of the invention also adapted to effect QPSK type phase modulation.

FIG. 10 shows another form of QPSK in which the binary outputs of two data sources 55 and 56 are encoded by encoding logic 57 to energize the four output terminals 78, 79, 80 and 81 thereof in accordance with the truth table of FIG. 11, which shows that each combination of the binary outputs of data sources 55 and 56 of FIG. 10 is represented by a phasor having a predetermined phase difference with respect to the phase of the immediately preceding phasor, rather than always being represented by the same phasor output from divider 11, as in the case of the structure of FIG. 8.

The type phase modulation of FIG. 10 is implemented as follows. When data sources 55 and 56 both contain binary 0's, the output terminal 78 of encoding logic 57 is energized. Since terminal 78 is not connected to any external logic, there will be no change in the selection of a phasor from divider 11 from the prior phasor which was selected during the immediately preceding bit period. For purposes of discussion, assume such prior phasor to be phasor 2B which was selected by virtue of a count of 01 in two-bit position up/down counter 71, and thereby energizing output terminal 35 of encoding logic 15, all in accordance with the truth table of FIG. 5.

If data sources 55 and 56 next contain a binary 1 and a binary 0, respectively, then output terminal 80 of encoding logic 57 is energized. AND gate 68 is thereby primed to pass two pulses from data clock pulse source 18 therethrough via lead 75. Such two clock pulses pass through OR gate 70 to the input terminal 77 of up/down counter 71 to cause said counter 71 to count up two counts to a count of 11, thereby energizing the output terminal 36 and then output terminal 37 of encoding logic 15. Energization of output terminal 37 causes phasor select logic 12 to select phasor 2D whose phase is 180° advanced with respect to the preceding selected phasor 2B, in accordance with the truth table of FIG. 11. The occurrence of another binary permutation of a 1 and a 0 in data sources 55 and 56, respectively, will again result in energization of output terminal 80 of encoding logic 57 to prime AND 68 and permit two more pulses from source 18 to pass therethrough and then through OR gate 70 to up/down counter 71. The counter 71 will again advance two counts to then contain a binary count of 01 which will finally energize output terminal 35 of encoding logic 15 to cause phasor select logic 12 to select phasor 2B from the output of divider 11. Thus, a phase advance of 180° from the phase of the immediately preceding phasor 2D has occurred in two 90° steps.

The occurrence next of a binary 1 in both of the data sources 55 and 56 will result in the energization of output terminal 81 of encoding logic 57 and thus in the priming of AND gate 69 to pass one pulse therethrough from source 18 to cause counter 71 to count down one count from its previous count of 01 to a new count of 00. Such count of 00 will energize output terminal 34 of encoding logic 15 to select phasor 2A from the four phasor outputs of divider 11, a delay of 90° from the phase of the immediately preceding selected phasor 2B.

An occurrence of a binary 0 and a binary 1 in data sources 55 and 56, respectively, will result in energization of terminal 79 of logic 57 to prime AND gate 67 to pass one pulse from source 18 to the count-up input 77 of counter 71, thereby changing the count of counter 71 from 00 to 01 and energizing output terminal 35 of encoding logic 15. Phasor 2B is selected thereby which is advanced 90° from the immediately preceding selected phasor 2A.

The above examples have illustrated various forms of phase modulation including some differential coherent phase modulation forms of the invention. Other differentially encoded forms of phase modulation can similarly be implemented by differencing successive data bits before the modulation occurs.

While throughout the description, N has been assumed to be 4, it may instead be some other value, such as 6 or 8 or 11, in which case the phasors generated by divider 11 would be separated by $360°\div 6 = 60°$, $360°\div 8 = 45°$ or $360°\div 11 \cong 32.73°$, respectively. When N=8, for example, the system could encode binary data from three data sources ($2^3=8$). Alternatively, if N=8 and only one data source is involved, the discrete phase changes can be reduced from two 90° phase shifts for each data bit (where N=4) to four 45° phase shifts for each data bit, thus reducing the generation of spurious signals.

Generally, if $N=2^x$, where x is an integer, the discrete phase changes will be equal to $360°\div N$ and x will be the greatest number of data channels which can be encoded, or alternatively, a lesser number of data channels can be encoded with a greater number of smaller discrete phase shifts occurring during each bit period. For example, if x=5, 32 phasors will be produced, separated by $360°/32=11.25°$. A shift of 90° can then be effected, in eight discrete shifts each of 11.25°, by the occurrence of eight data clock pulses during each data bit period.

What is claimed is:

1. A digitized angle modulating means comprising:
   means for generating N alternating signals each of frequency $C_a/N$ and spaced apart $360°/N$;
   binary data source means having a bit rate $f_s$;
   pulse generating means for generating a train of pulses of frequency $mf_s$, where m is an integer;
   logic means comprising counter means responsive to the state of the binary data in said binary data source means and to the concurrent occurrence of said pulses to change the count of said counter means by a predetermined amount; and
   gating means responsive to the various counts contained in said counter means to select predetermined ones of said N signals.

2. A digitized angle modulating means as in claim 1 in which:
   said counter means comprises an up/down counter having first and second input terminals and responsive to pulses supplied to said first and second input terminals to count upwardly and downwardly, respectively; and
   in which said logic means further comprises means for alternately gating the said pulses from said pulse generating means to said first input terminal of said counter means for a given number of bit periods and then to said second input terminal for said given number of bit periods and continuing such gating in such alternate manner.

3. A digitized angle modulating means as in claim 1 in which:

said logic means comprises first and second output terminals and is responsive to first predetermined states of the binary data in said binary data source means to pass predetermined numbers of said pulses to said first output terminal and to second predetermined states of the binary data in said binary data source means to pass a predetermined number of said pulses to said second output terminal;

in which said counter means comprises up/down counter means responsive to said pulses appearing on said first output terminal to count upwardly and to the pulses appearing on said second output terminal to count downwardly; and in which said gating means is responsive to the upwardly count of said counter means to select one of said N signals whose phase angle is rotated in a first direction from the phasor angle of the immediately preceding selected signal of said N signals and responsive to the downwardly count of said counter means to select one of said N signals whose phase angle is rotated in a second direction from the phase angle of the immediately preceding selected signal of said N signals.

4. A digitized phase angle modulating means as in claim 1 in which said counter means comprises up/down counter means responsive to predetermined states of said binary data source means for each bit period to count up or down a predetermined number of counts with the amount and direction of such count change being representative of the state of the binary data in said binary data source means during the currently received data bit period with respect to the state of the binary data in said binary source means during the immediately preceding bit period.

5. A digitized phase modulating means comprising:
means for generating N signals each of frequency $C_a/N$ and having phases spaced apart $360°/N$;
binary data source means having a bit rate $f_s$;
pulse generating means for generating a train of pulses of frequency $mf_s$, where m is an integer;
first gating means comprising output terminal means responsive to the current state of the binary data in said binary data source means to pass a predetermined number of said pulses to said output terminal means;
counter means of count capacity N responsive to said pulses supplied to said output terminal means to change its count to represent the state of the binary data in said binary data source means; and
second gating means responsive to the count contained in said counter means to select predetermined ones of said N signals.

6. A digitized phase modulating means as in claim 5 in which:
said counter means comprises an up/down counter having first and second input terminals and responsive to pulses supplied to said first and second input terminals to count upwardly and downwardly, respectively; and
in which said first gating means further comprises means for alternately gating the said pulses from said pulse generating means to said first input terminal of said counter means for a given number of bit periods and then to said second input terminal for said given number of bit periods and continuing such gating in such alternate manner.

7. A digitized phase modulating means as in claim 5 in which:
said output terminal means of said first gating means comprises first and second output terminals;
in which said first gating means is further responsive to first predetermined binary data states of said binary data source means to pass a predetermined number of said pulses to said first output terminal and to second predetermined binary data states of said binary data source means to pass a predetermined number of said pulses to said second output terminal;
in which said counter means comprises an up/down counter responsive to said pulses appearing on said first output terminal to count upwardly and to the pulses appearing on said second output terminal to count downwardly; and
in which said second gating means is responsive to the upwardly count of said counter means to select one of said N signals whose phase is rotated in a first direction from the phase of the immediately preceding selected signal of said N signals, and is responsive to the downwardly count of said counter means to select one of said N signals whose phase is rotated in a second direction from the phase of the immediately preceding selected signal of said N signals.

8. A digitized phase modulating means comprising:
means for generating N signals each of frequency $C_a/N$ and having phases spaced apart $360°/N$;
binary data source means having a bit rate $f_s$; and
logic means including up/down counter means responsive to predetermined binary data states of said binary data source means during each data bit period $1/f_s$ to count up or down a predetermined number of counts, with the amount and direction of such count being representative of the binary data state of said binary data source means during the currently received data bit period with respect to the binary data state of said binary source means during the immediately preceding bit period.

9. A digitized phase modulating means comprising:
means for generating N signals of frequency $C_a/N$ and having phases spaced apart $360°/N$;
means for generating a binary modulation sequence representative of successive binary states and having a bit rate $f_s$;
pulse generating means for generating a train of clock pulses of frequency $mf_s$, where m is an integer;
first logic means comprising counting means responsive to the binary state of the currently received binary modulation sequence and to the concurrent occurrence of said clock pulses to change count by a predetermined amount and in a predetermined direction; and
second logic means responsive to the count in said counting means to select one of said N signals whose difference in phase and whose direction of phase from the phase of the immediately preceding selected one of said N signals is representative of the said binary state of said currently received binary modulation sequence.

10. A digitized phase modulating means as in claim 9 in which said first logic means comprises:
first gating means comprising output terminal means and responsive to the nature of the binary state of said binary modulation sequence to pass a predetermined number of said pulses to said output terminal means;

said counting means responsive to said pulses supplied to said output terminal means to change its count to represent the binary data state of said binary modulation sequence; and second gating means responsive to the count contained in said counting means to select predetermined ones of said N signals.

11. A digitized phase modulating means as in claim 9 in which said counting means comprising up/down counter means responsive to the binary state of said binary modulation sequence during each successive data bit period to count up or down a predetermined number of counts with the amount and direction of such count being representative of the binary state of said binary modulation sequence for the currently received data bit period $1/f_s$ with respect to the binary state of said binary modulation sequence during the immediately preceding data bit period.

12. A digitized phase modulating means as in claim 9 and in which said first logic means further comprises:

first gating means responsive to first binary states of said binary modulation sequence and to said clock pulses to generate pulses of a first type, and to second binary states of said binary modulation sequence and to said clock pulses to generate pulses of a second type;

in which said counting means is responsive to said first type pulses to count upwardly and to said second type pulses to count downwardly; and second gating means responsive to the upwardly count of said counting means to select one of said N signals whose phase is rotated in a first direction from the phase of the immediately preceding selected signal of said N signals, and is responsive to the downwardly count of said counting means to select one of said N signals whose phase is rotated in a second direction from the phase of the immediately preceding selected signal of said N signals.

* * * * *